Dec. 22, 1953     H. A. VAN LOON     2,663,063
MOLDING MACHINE AND METHOD OF MOLDING
Filed March 28, 1947     4 Sheets-Sheet 1
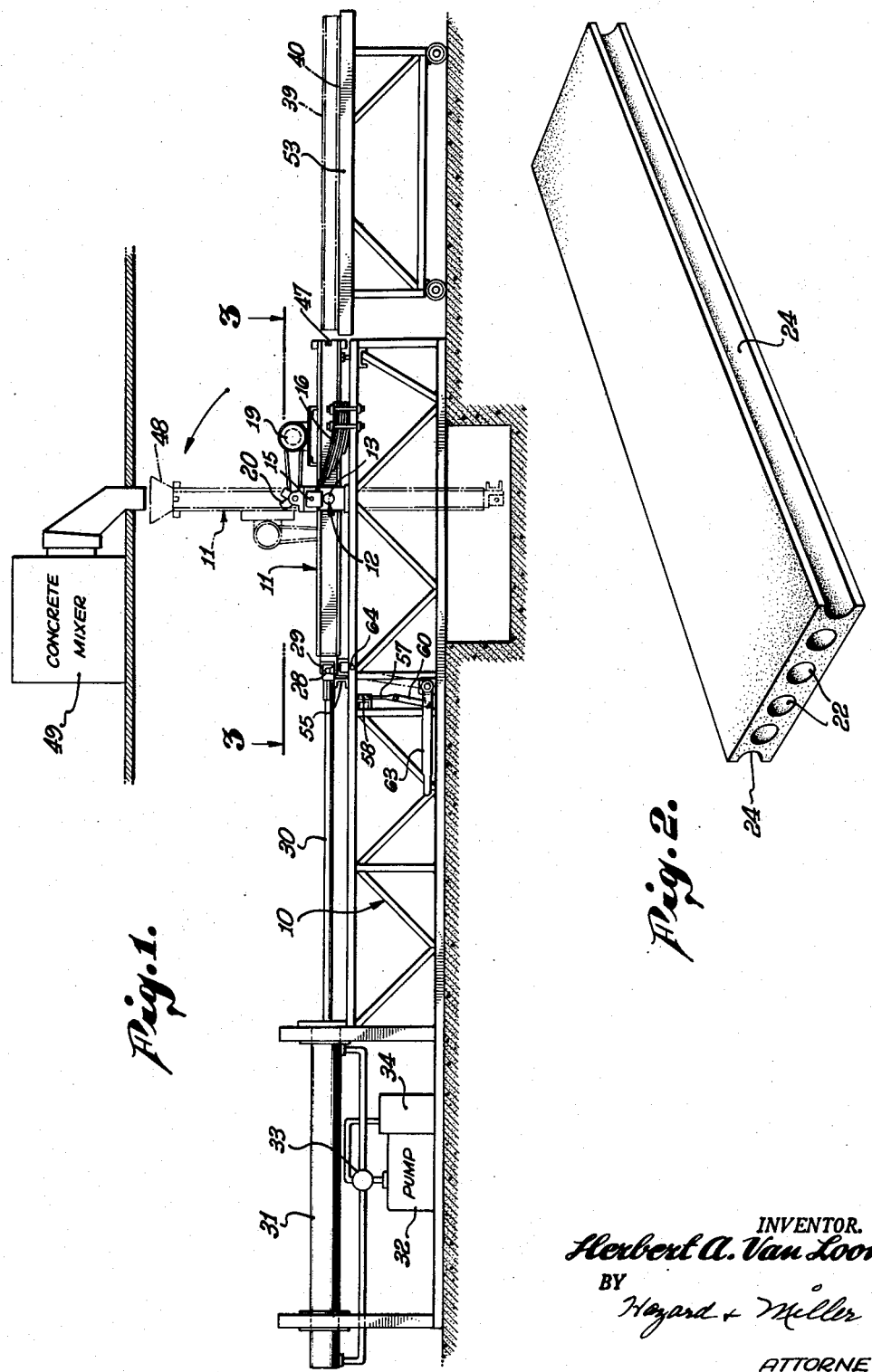
INVENTOR.
Herbert A. Van Loon
BY
Hazard + Miller
ATTORNEYS Dec. 22, 1953　　　H. A. VAN LOON　　　2,663,063
MOLDING MACHINE AND METHOD OF MOLDING
Filed March 28, 1947　　　　　　　　4 Sheets-Sheet 2
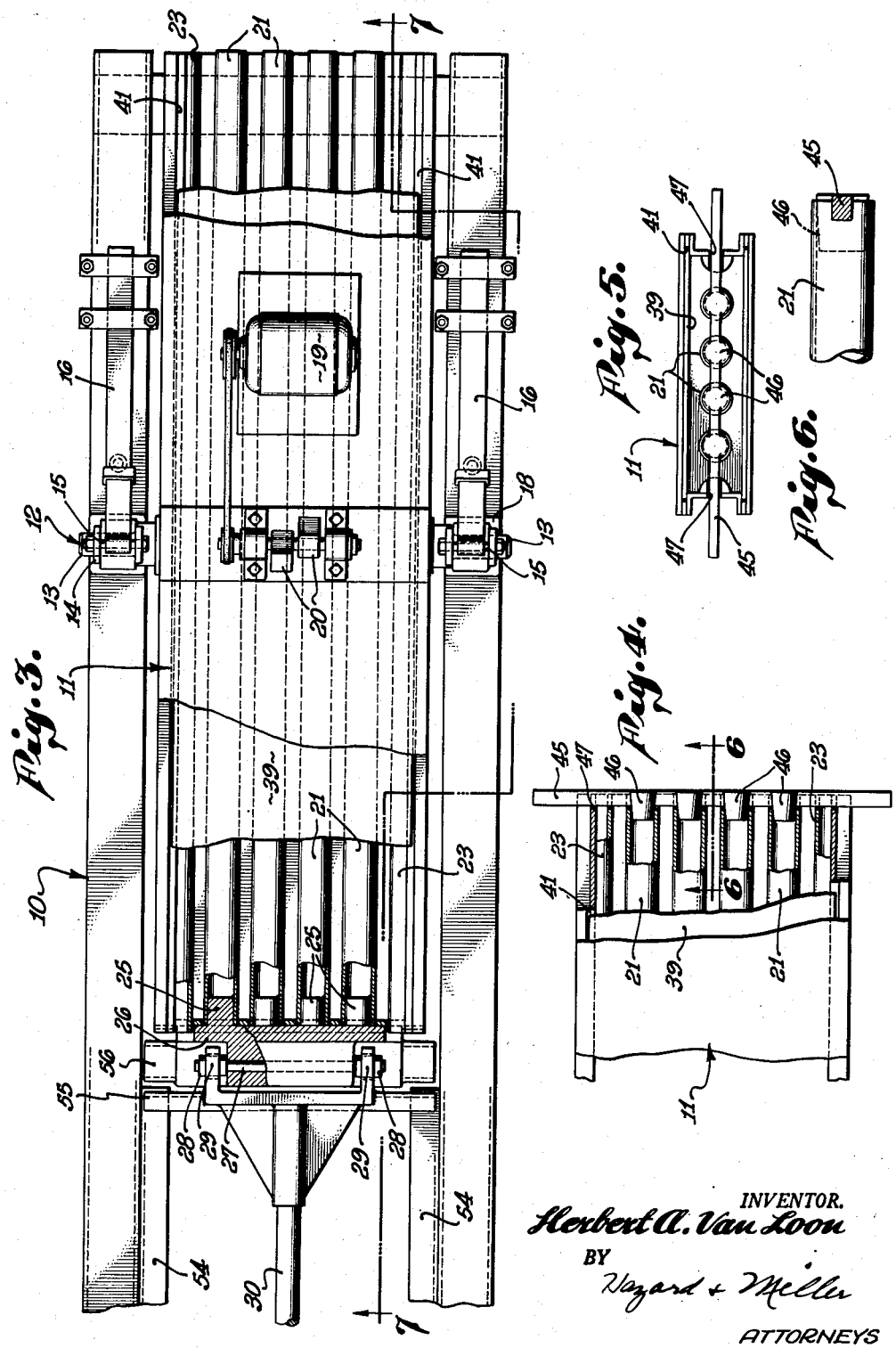
INVENTOR.
Herbert A. Van Loon
BY
Hazard & Miller
ATTORNEYS Dec. 22, 1953  H. A. VAN LOON  2,663,063
MOLDING MACHINE AND METHOD OF MOLDING
Filed March 28, 1947  4 Sheets-Sheet 3
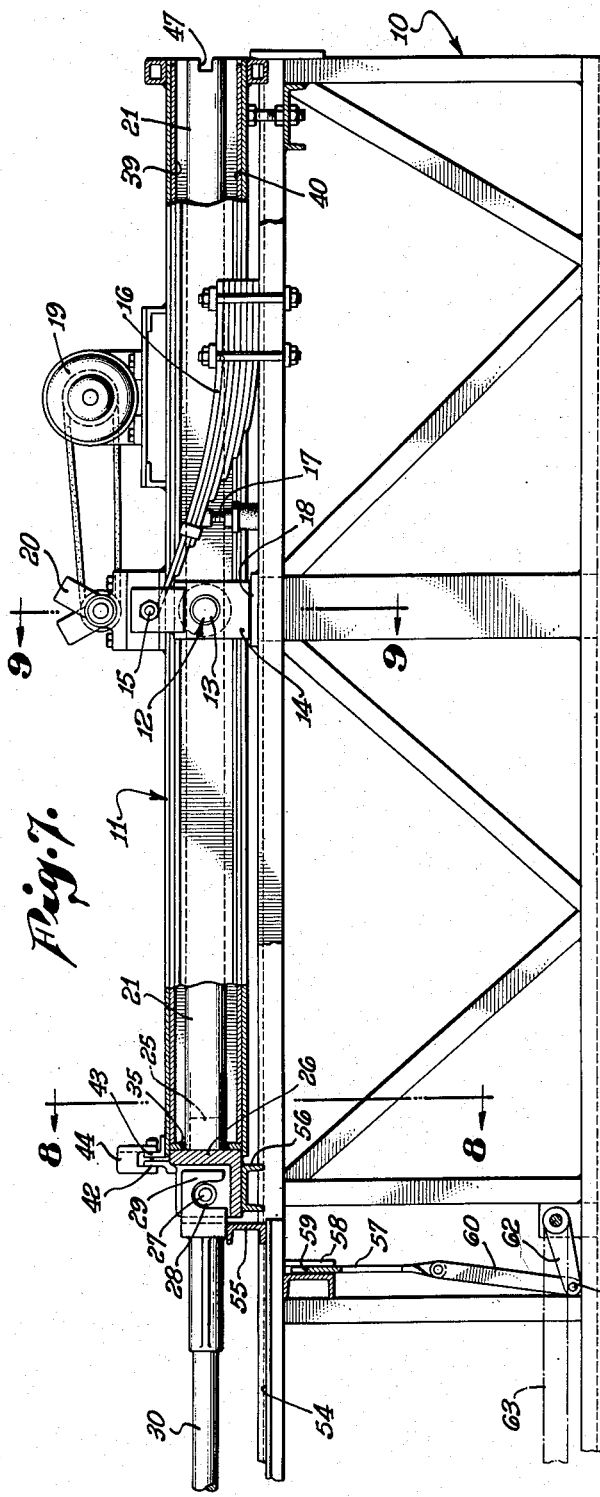
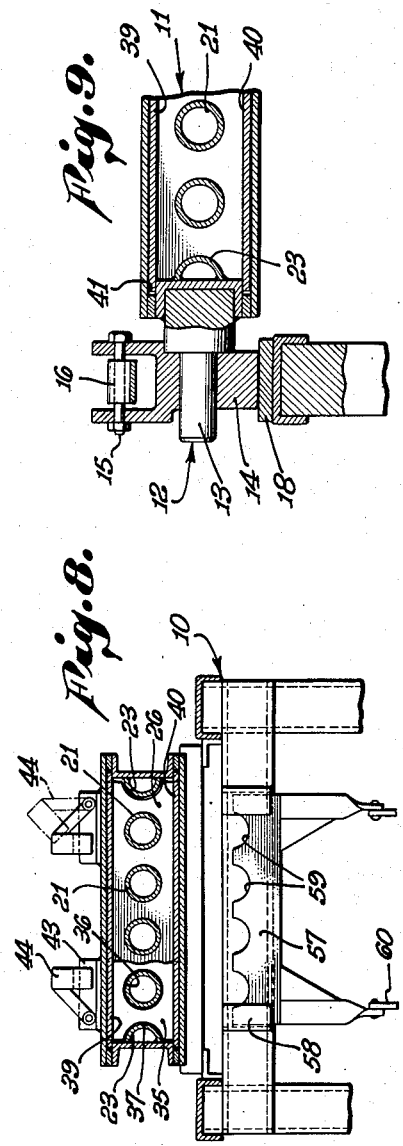
INVENTOR.
Herbert A. Van Loon
BY
Hazard & Miller
ATTORNEYS Dec. 22, 1953   H. A. VAN LOON   2,663,063
MOLDING MACHINE AND METHOD OF MOLDING
Filed March 28, 1947   4 Sheets-Sheet 4
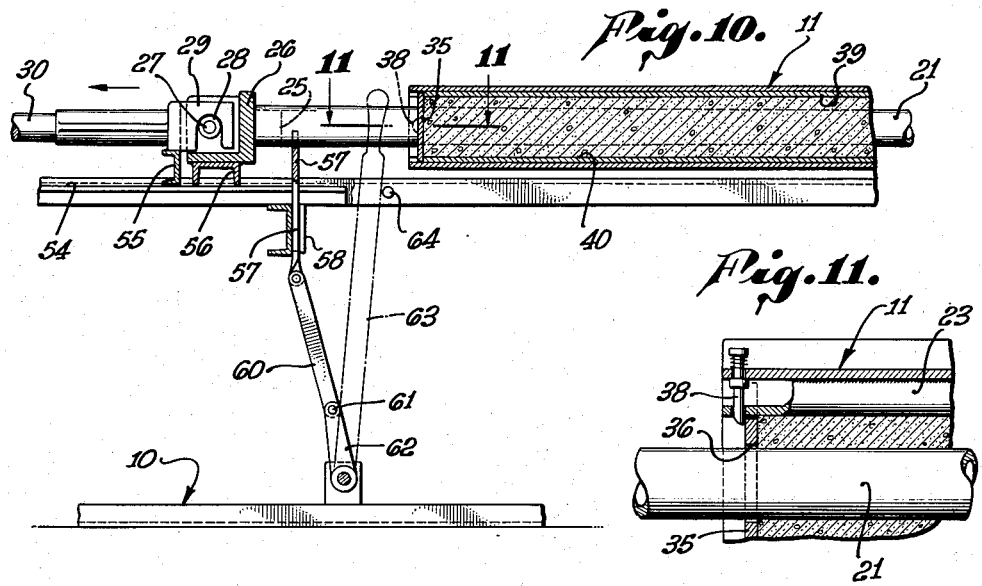
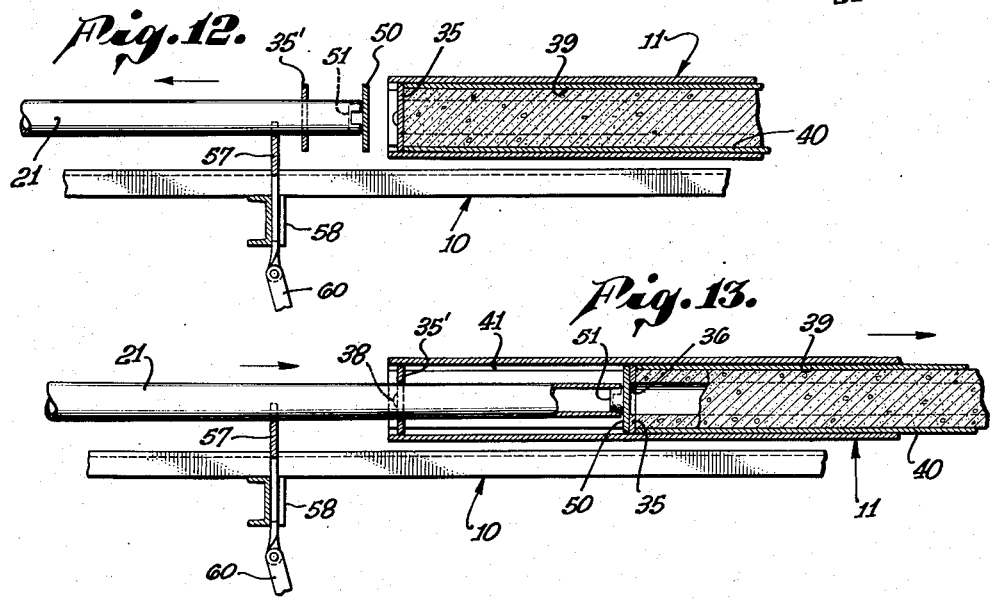
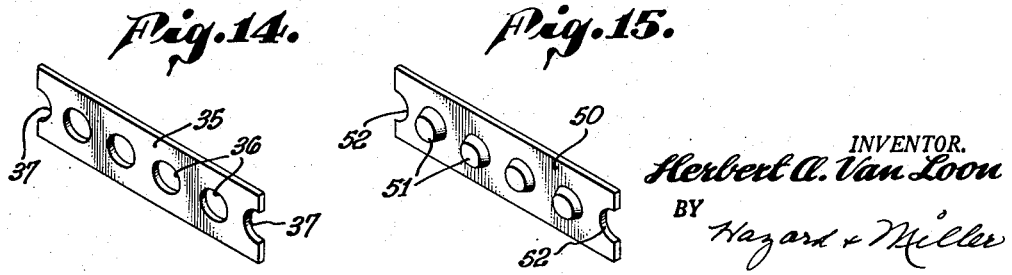
INVENTOR.
Herbert A. Van Loon
BY Hazard & Miller
ATTORNEYS Patented Dec. 22, 1953

2,663,063

UNITED STATES PATENT OFFICE 2,663,063

MOLDING MACHINE AND METHOD OF MOLDING

Herbert A. Van Loon, Bishop, Calif., assignor of one-half to Donald R. Smith, Altadena, Calif.

Application March 28, 1947, Serial No. 737,748

4 Claims. (Cl. 25—41)

This invention relates to a means and method of forming or molding building tiles or blocks and similar structures.

A primary object of the invention is to provide an improved means and method of molding an elongated block formed of concrete or similar self-hardening material wherein core openings are formed that extend longitudinally through the block providing air spaces that not only lighten the block but contribute to its heat and sound insulating qualities.

More specifically, an object of the invention is to provide a molding device consisting of an open-ended mold that is pivotally mounted intermediate its ends for tilting movement about a horizontal axis enabling the mold to be swung into a vertical position in which it may be filled with concrete or like material and enabling it to be swung into a horizontal position wherein the cores can be withdrawn from the mold and, after having been withdrawn, they may be used to expel the molded article from the mold and in so doing become repositioned within the mold ready for a subsequent filling of the mold.

Another object of the invention is to provide a molding apparatus having the above-mentioned characteristics wherein the cores are detachably connected to the withdrawing means to enable the mold to be swung into its vertical position and which will permit of the connection to be re-established readily when the mold is returned to its horizontal position.

With the foregoing and other objects in view, which will be made manifest in the following detailed description and specifically pointed out in the appended claims, reference is had to the accompanying drawings for an illustrative embodiment of the invention wherein:

Figure 1 is a somewhat schematic view in side elevation of the improved molding apparatus, the mold proper being illustrated in horizontal position in full lines and in vertical or filling position in dotted lines;

Fig. 2 is a perspective view of the type of block or tile that is molded or formed with the improved apparatus;

Fig. 3 is a top plan view of the mold proper, parts being broken away and shown in vertical section;

Fig. 4 is a view of a portion of the mold proper, parts being broken away and shown in horizontal section illustrating a core-centering device that may be utilized to center the cores adjacent one end of the mold;

Fig. 5 is an end view in elevation of that portion illustrated in Fig. 4;

Fig. 6 is a sectional view taken substantially upon the line 6—6 upon Fig. 4;

Fig. 7 is a view in side elevation of the mold proper, parts being broken away and shown in section substantially upon the line 7—7 upon Fig. 3;

Figs. 8 and 9 are sectional views taken substantially upon the lines 8—8 and 9—9, respectively, upon Fig. 7;

Fig. 10 is a partial view in section illustrating the mechanism employed for supporting the cores when they have been withdrawn from the mold;

Fig. 11 is a horizontal section taken substantially upon the line 11—11 upon Fig. 10;

Fig. 12 is a partial view in vertical section illustrating the cores as having been withdrawn from the mold and prepared to expel the molded block from the mold;

Fig. 13 is a view similar to Fig. 12 but illustrating the molded block in the course of its being expelled from the mold;

Fig. 14 is a perspective view of a masking plate that is utilized as a part of the apparatus; and Fig. 15 is a perspective view of a pusher plate that is also utilized as a part of the apparatus.

Referring to the accompanying drawings wherein similar reference characters designate similar parts throughout, the improved molding device is supported on a suitable framework generally indicated at 10. On this framework an open-ended tubular mold 11 is pivotally mounted as at 12 for rotation about a horizontal axis. This pivotal mounting is provided by means of trunnions 13 which are secured to the sides of the mold and which extend through bearings or journals 14. The bearings or journals 14 are suspended such as by shackle bolts 15 from cantilever leaf springs 16 that are rigidly mounted on the sides of the frame. Adjustment of these cantilever springs may be accomplished to some extent by means of jack screws 17. Downward movements of the journals or bearings 14 are limited by means of bumper plates 18. This pivotal mounting enables the mold 11 to be swung or tilted from the horizontal position shown in full lines in Fig. 1 to the vertical or dotted line position shown therein; and the spring suspension for the pivotal mounting enables the mold to be vertically vibrated except as limited by the bumper plates 18. As a means for vibrating the mold an electric motor or other source of power, indicated at 19, is mounted on the wall of the mold and serves to drive an eccentric weight 20 which, when driven, is effective to vibrate the mold vertically while in the vertical position, this being permitted by means of the spring suspension from the springs 16.

A plurality of tubular cores 21 are provided which, when within the mold, extend from end to end thereof. These cores are designed to core the longitudinally extending openings 22 (see Fig. 2) in the block that is produced. While these cores are designed to be withdrawn or removed from the mold and re-positioned therein, half cores 23 are stationarily or permanently mounted on the end walls of the mold and remain permanently therein. These half cores are designed to form the half rounds 24 (see Fig. 2) on the edges of the block. The various cores 21 are welded or otherwise secured to cylindrical bosses 25 on a cross head 26 that carries a transversely extending rod or shaft 27 equipped at its projecting ends with rollers 28 thus forming trunnions at the sides of the cross head that are reciprocable in hooks 29 on the piston rod 30 of a hydraulic ram. The hydraulic ram may consist merely of a cylinder 31 within which a piston is reciprocable. A pump 32 supplies liquid under pressure to either end of the cylinder 31, the direction of flow being controlled by a control valve 33. This control valve is preferably in the form of a four-way valve designed so that when the pump is supplying liquid to one end of the cylinder, liquid from the other end of the cylinder may be returned therethrough to a reservoir 34. In this manner the piston rod 30 may be forcibly driven in either direction and while any equivalent means for moving the piston rod 30 back and forth might be employed, a hydraulic ram is preferable due to its simplicity and the available power that it may exert on the piston rod.

As the piston rod 30 moves from right to left as viewed in Figs. 1, 3 and 7, the cores 21 can be pulled or withdrawn from the mold, and conversely, as the piston rod 30 moves from left to right the cores may be returned into the mold. The crotches of the hooks 29 being downwardly open, permit of ready detachment of the cores from the piston rod and enable the mold with the cores therein to be swung from the horizontal position into the vertical position. Several masking plates are provided one of which is illustrated at 35 in Fig. 14. These masking plates have apertures 36 therein designed to pass the cores therethrough and have semi-circular recesses 37 at their ends so that these masking plates may slide over the half rounds or stationary half cores 23. These masking plates are designed to be positioned in the ends of the mold and to be retained therein such as by spring actuated latches 38 (see Fig. 11). In this position the masking plates abut against lining plates or pallets 39 and 40 that are positioned against the inner faces of the top and bottom of the mold, respectively. The edges of these lining plates or pallets are slidably disposed in grooves 41 in the corners of the mold so that when the contents of the mold are expelled, as illustrated in Fig. 13, the lining plates or pallets will be expelled with the molded block.

As a means for retaining the cores 21 within the mold when the mold is turned in vertical position, the cross head 26 is equipped with upstanding flanges 42 arranged to abut complementary flanges 43 on the top or side wall of the mold. Latches 44 are pivotally mounted on the flanges 43 and are adapted to engage the flanges 42 to lock the cross head against the end of the mold. However, on swinging the latches into the dotted line position shown in Fig. 8, the cross head can be detached from the mold to enable withdrawal of the cores by the piston rod 30.

As a means for centering the cores 21 at the top of the mold when the mold is in its vertical position, a transversely extending bar 45 is provided carrying tapered core entering members 46 designed to enter the upper ends of the cores. This bar is receivable in notches 47 in the end walls of the mold and serve to hold the cores 21 against leaning toward either side of the mold.

The operation of the above-described construction is as follows. Assuming that the cores are in position within the mold and that the masking plate 35 is in position therein about the cores, the latches 44 are shifted to lock the cross head 26 to the end of the mold. The mold is then swung in a counter-clockwise direction to the dotted line position shown in Fig. 1, turning about the pivotal connection at 12. When the mold is in its vertical position the centering bar 45 may be applied to hold the cores centered with relation to the mold. A removable hopper 48 is then applied to the top of the mold and a self-hardening material such as concrete may be poured into the mold such as from a concrete mixer 49. While this material may be conventional concrete, I prefer to employ for this purpose a mixture of Portland cement and fine and coarse pumice that have been only lightly moistened. The amount of water added preferably to my preferred mix is only that required to dampen the mix so that it will hold together if squeezed or packed. A wetter mixture may be employed with other types of materials. As this mix is poured into the mold the vibrator afforded by the motor 19 and the eccentric weight 20 is operated to cause the entire mold and the contained cores to be vertically vibrated to settle or pack the self-hardening material as it is fed into the mold. When the mold has been completely filled and has been adequately vibrated, the hopper 48 is removed and the mold swung in a clockwise direction from the dotted line position shown in Fig. 1 to the full line position shown therein. In so doing the trunnions provided by the rollers 28 on the rod or shaft 27 then enter the crotches of the hooks 29. The hydraulic ram is then set in operation by means of the control valve 33 to draw the piston rod 30 and the hooks 29 from right to left thus withdrawing the cores 21 from within the molded block. As the cores are withdrawn the masking plate 55 which is latched in the end of the mold by means of the latch 38 prevents the concrete or molded material from being withdrawn with the cores. After the cores have been completely withdrawn to the position shown in Fig. 12, a second masking plate 35' is applied over the ends of the cores, as indicated in this figure, and a pusher plate 50 (see Figs. 12 and 15) is applied over the ends of the cores. This pusher plate merely has bosses 51 thereon designed to enter the ends of the cores and has recessed ends indicated at 52 that accommodate the half rounds or partial cores 23. When the pusher plate is applied the hydraulic ram is again operated by reversely shifting the control valve 33 to move the piston rod 30 from left to right. During such movement the pusher plate engages the masking plate 35 that is within the end of the mold and pushes the molded block out of the mold as indicated in Fig. 13. During this expelling movement the pallets or plates 39 and 40 slide out of the mold in their respective grooves 41 and move with the molded block onto a conveyor or dolly 53. The block may thus be transported to any suitable location for setting or curing of the concrete and in order to hasten the setting I find it advantageous to connect conductors of an alternating current supply to the two plates 39 and 40 so that an alternating current of adequate capacity is caused to pass through the molded concrete between the plates. The concrete acting as a conductor of adequate resistance becomes heated by this current and the heat generated is sufficient to cause a preliminary set to quickly take place. After this set takes place, either or both of the plates 39 and 40 can be removed from the block and returned to the mold or, in lieu thereof, substitute plates 39 and 40 may be positioned in the mold for a subsequently cycle of operation. These plates may be inserted into the mold after the pusher plate 50 has been removed from the ends of the cores after having passed entirely through the mold.

As the cores are forced into the mold to expel the molded block the second masking plate 35' is carried by the cores into the mold past the latch 38 and is thus locked in position to occupy the same position previously occupied by the masking plate 35. In this manner it will be appreciated that the cores after being withdrawn from the mold are utilized to expel the molded block from the mold and, in so doing, they are simultaneously returned to the interior of the mold so as to be in position for a subsequent cycle of operation. Consequently when the plates 39 and 40 or their substitutes are positioned in the mold, it is then ready to be again swung into the vertical filling position and to be re-filled to mold a subsequent block. The masking plate 35 that was pushed out of the mold ahead of the pusher plate 50 is recovered when the block is completely expelled from the mold onto the conveyor or dolly 53 and is returned to be subsequently used for the masking plate 35.

It will be appreciated that some means must be provided for supporting the cores when they are completely withdrawn from the mold and to this end the frame 10 supports rails 54 on which runners 55 on the hooks 29 are slidable. The cross head 26 is likewise provided with runners 56 that are also slidable on these rails. The rails 54, however, terminate as shown in Fig. 7 so that when the cores 21 are entirely within the mold the runners 56 have passed beyond the ends of the rails 54 so that the rails do not interfere with the swinging movement of the mold and its contained cores from the horizontal to the vertical position. When the cores are withdrawn from the mold the runners 56 pass onto the rails and will support the cross head 26 to which the cores are secured at one end. As a means for supporting the other ends of the cores when they are completely withdrawn, a vertically reciprocable supporting member 57 is slidably mounted in a guide 58 on the frame. This supporting member is notched as at 59 (see Fig. 8) to receive the lower ends of the cores. The supporting member is vertically reciprocated by means of a link 60 pivotally connected as at 61 to a crank 62 on a hand lever 63 and after the cross head 26 has passed from the position shown in Fig. 7 to the position shown in Fig. 10, the hand lever 63 is swung from the position shown in Fig. 1 to the position shown in Fig. 10. In so doing the pivotal connection 61 passes over center or beyond a straight line joining the pivotal connection between the links 60 and the support 57 and the axis of rotation of the crank 62 so that the weight of the cores applied to the supporting member 57 will be such as to urge the hand lever against a stop 64 on the frame. The supporting member 57 will thus be locked automatically in its uppermost position wherein it can support the cores as they are completely withdrawn from the mold and while they are in the position shown in Fig. 12. When the cores are returned to the mold the lever 63 is returned from the position shown in Fig. 10 to the position shown in Fig. 1 so as to retract the supporting member 57 into the positions shown in Figs. 6, 7 and 8 wherein it will not interfere with the runners 56 and the cross head 26.

It will be appreciated from the above-described construction that a novel means and method for molding cored blocks and similar articles is provided which reduces the time and operations necessary to a minimum. The mold can be readily swung about its central horizontal axis at 12 into a vertical position wherein it can be easily filled and during the filling the mold can be bodily vibrated by means of the eccentric weight 20 to settle and pack the self-hardening material that is fed into the mold through the hopper 48. When the mold is completely filled it can be easily turned into the horizontal position and in so doing the trunnions on the cross head 26 will automatically engage the hooks 29. The ram can then be employed to withdraw the cores from the block and after having been completely withdrawn, the masking plate 35' and the pusher plate 50 applied to the cores. Thereafter the cores may be advanced by the ram to expel the block that was previously cored and in so doing the cores are returned to their initial position within the mold, thus readying the mold for a subsequent cycle of operation. When the block is expelled the concrete may be hastily set by the application of the alternating current terminals to the plates or pallets although this is not essential. However, when a current is used the block will be caused to take a quick preliminary set to thus free the plate 39 and 40 for subsequent use in the mold. In this way an excessive number of plates 39 and 40 is not required. Direct current might be employed for this purpose except that it is apt to promote electrolytic action in the concrete which is undesirable. It will be appreciated by those skilled in the art that the improved machine enables cored blocks to be easily and quickly produced.

Various changes may be made in the details of construction without departing from the spirit and scope of the invention as defined by the appended claims.

I claim:

1. The method of making cored molded objects which consists of positioning cores in a mold, placing a self-hardening material in the mold about the cores, withdrawing the cores from the mold while leaving the self-hardening material therein, interposing a presser plate between the cores and the molded material, and re-introducing the cores into the mold to return the cores to the mold and simultaneously expel the molded contents from the mold.

2. A molding machine comprising an open-ended mold, means pivotally and resiliently mounting the mold enabling the mold to assume either an upright filling position in which it may be vibrated or a horizontal unloading position, cores receivable in the mold and adapted to swing therewith into either position assumed by the mold, means forming a closure for the bottom of the mold about the cores when the mold is in upright position, and means attachable to and detachable from the cores when the mold is in horizontal position for pulling the cores from the mold and forcing them therein when the mold is in such position.

3. A molding machine comprising an open-ended mold, means pivotally and resiliently mounting the mold enabling the mold to assume either an upright filling position in which it may be vibrated or a horizontal unloading position, cores receivable in the mold and adapted to swing therewith into either position assumed by the mold, means forming a closure for the bottom of the mold about the cores when the mold is in upright position, means attachable to and detachable from the cores when the mold is in horizontal position for pulling the cores from the mold and forcing them therein when the mold is in such position, and means applicable to the forward ends of the cores for expelling the contents of the mold by the cores when the cores are forced into the mold.

4. The method of molding a cored object which includes positioning a mold containing cores in an upright position, filling the mold about the cores with a self-hardening material, turning the mold into a horizontal position, pulling the cores from the mold while in the horizontal position, interposing a presser plate between the cores and the contents of the mold, forcing the cores into the mold thus expelling the contents of the mold and at the same time returning the cores to the mold, and then swinging the mold and its contained cores into an upright position and refilling the mold and repeating.

HERBERT A. VAN LOON.

References Cited in the file of this patent

UNITED STATES PATENTS

| Number | Name | Date |
|---|---|---|
| 167,850 | Mildren | Sept. 21, 1875 |
| 417,163 | Foust | Dec. 10, 1889 |
| 616,401 | Callaway | Dec. 20, 1898 |
| 837,938 | Leggett | Dec. 11, 1906 |
| 1,438,448 | McCoy | Dec. 12, 1922 |
| 1,782,412 | Dietrichs | Nov. 25, 1930 |
| 2,235,440 | Mackert | Mar. 18, 1941 |

FOREIGN PATENTS

| Number | Country | Date |
|---|---|---|
| 47,732 | Switzerland | June 22, 1909 |